Oct. 22, 1963  J. L. CORBETT  3,108,251
INTERPOLATING SCANNERS
Filed April 29, 1959  5 Sheets-Sheet 1

INVENTOR
JOHN L. CORBETT
BY Elmer J. Gorn
ATTORNEY

INVENTOR
JOHN L. CORBETT
BY
ATTORNEY

Oct. 22, 1963 J. L. CORBETT 3,108,251
INTERPOLATING SCANNERS
Filed April 29, 1959 5 Sheets-Sheet 5

INVENTOR
JOHN L. CORBETT
BY Elmer J. Gorn
ATTORNEY

United States Patent Office

3,108,251
Patented Oct. 22, 1963

3,108,251
INTERPOLATING SCANNERS
John L. Corbett, Newton, Mass., assignor to Raytheon Company, Lexington, Mass., a corporation of Delaware
Filed Apr. 29, 1959, Ser. No. 809,877
8 Claims. (Cl. 340—16)

This invention relates to echo ranging equipment, and more particularly to interpolating scanners for such equipment, with the present application comprising a continuation-in-part of my original application, Serial No. 413,501, filed March 2, 1954, now abandoned.

In echo ranging equipment, such as sonar and radar, scanning of a target area can be accomplished either by physically moving a radiator of the energy used for the echo ranging, or by a fixed array of such radiators with the particular instantaneous direction of radiation and detection determined by controlling the phase and amplitude of the energy transmitted to or from the transducers at any given moment to give the same effect as physically rotating a single transducer. It is generally desirable to use a minimum number of transducers in order to provide small, lightweight equipment, and yet to be able to determine the bearing of a target with as great a bearing accuracy as possible.

By the present invention, use is made of the fact that the addition of any number of sine waves of the same frequency but different phases will produce a single sine wave, the amplitude and phase of which can be controlled by controlling the amplitude only of any one or more of the original sine waves. This is done by modulating the output of a generator in each of a plurality of phases with the output of a respective transducer of the array or a group of such transducers. When the modulated outputs of the generator in the different phases are combined and rectified, a pulse or other output indication is obtained for each target at a phase that is indicative of the bearing of the target with respect to the reference bearing, usually the ship's heading. An indication of range may be obtained by any of the usual methods for this purpose. The resulting pulse can be applied to a PPI cathode ray tube of any of the well-known types.

Other and further advantages of this invention will be apparent as the description thereof progresses, reference being had to the accompanying drawings, wherein.

Figure 5:
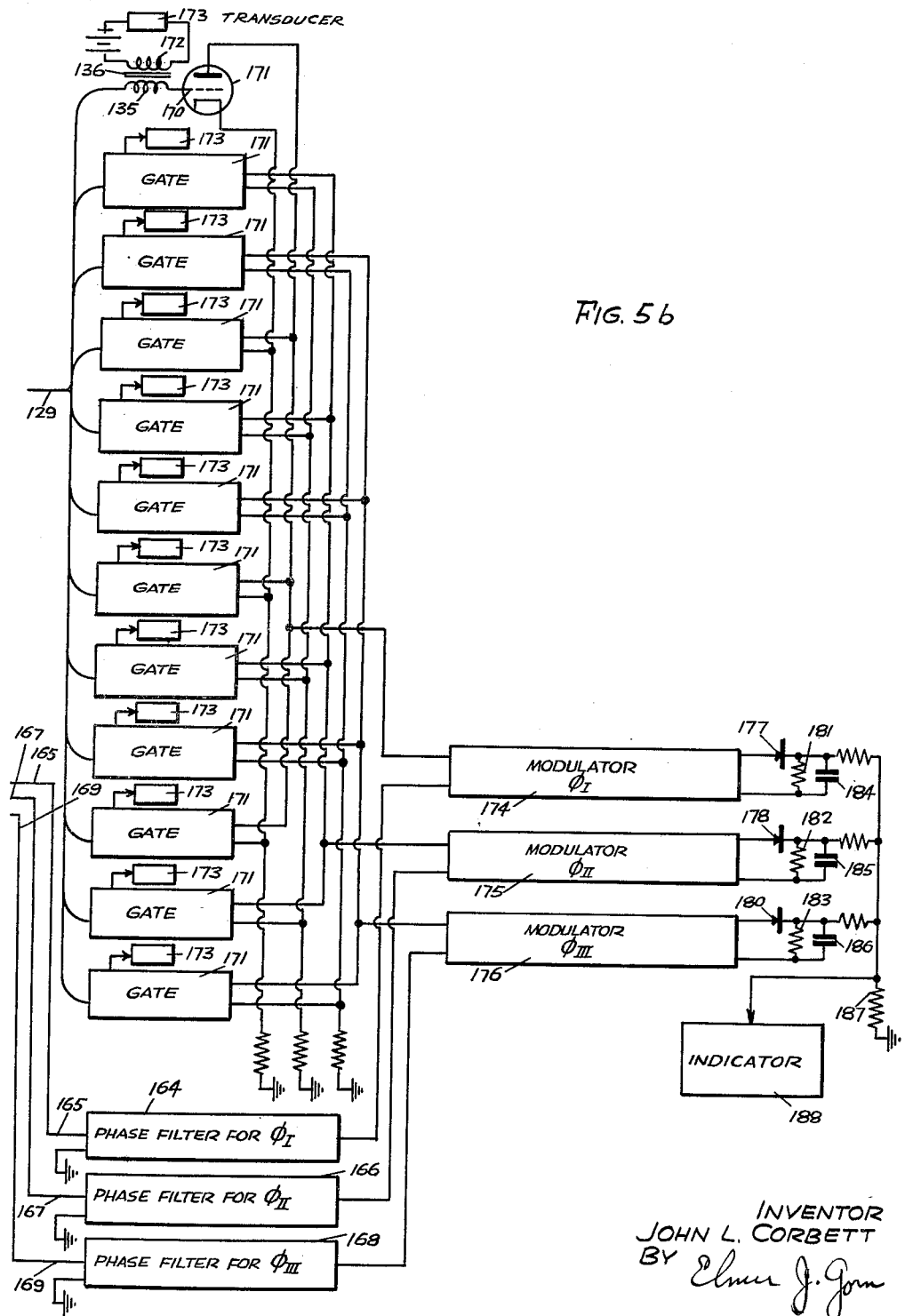
Figure 6:
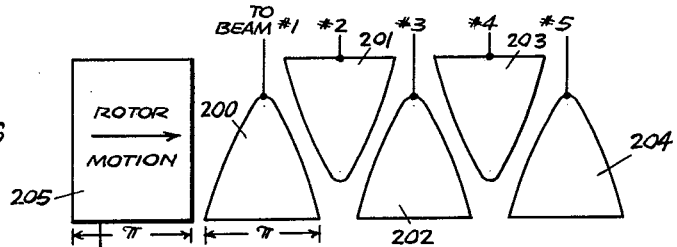
Figure 7:
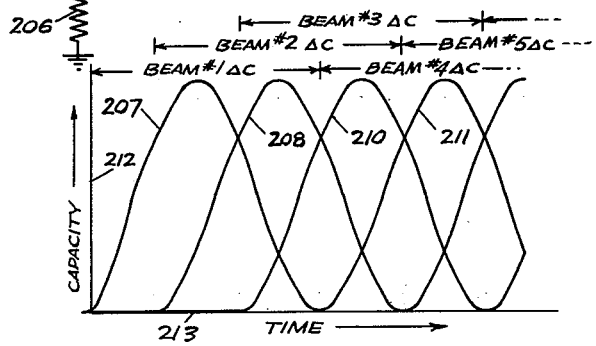

FIGS. 5a and 5b together comprise a schematic of an embodiment adapted to utilize the output of such a transformer system to interpolate bearings between the beams of the transducers;

FIG. 6 illustrates a developed cylindrical embodiment of a capacitive commutator that can be used with the system of the invention;

FIG. 7 illustrates the output wave form of the commutator of FIG. 6; and

Figure 8:
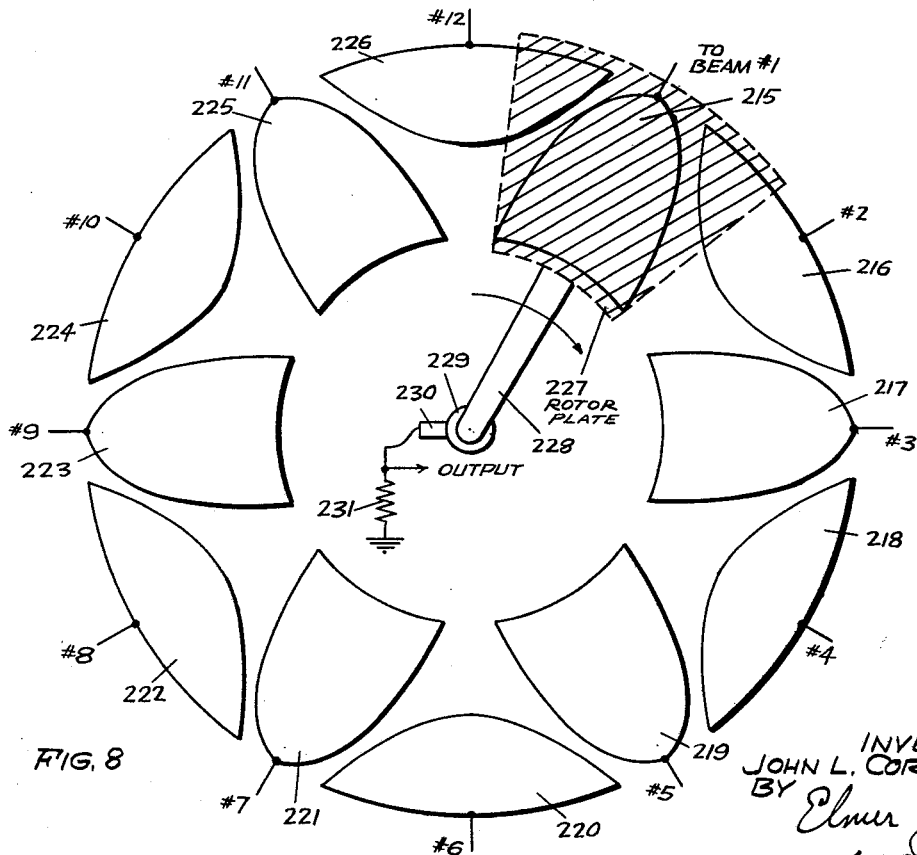

FIG. 8 illustrates schematically a radially arranged embodiment of the commutator of FIG. 6.

Figure 1:
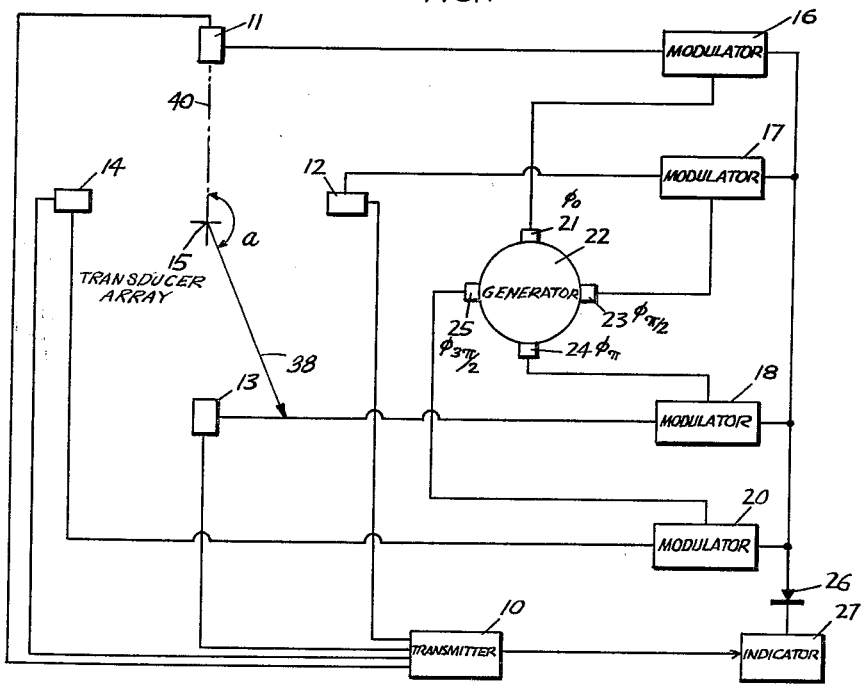
FIG. 1 is a block diagram of a scanning system embodying the invention.

In FIG. 1, the reference numeral 10 designates a transmitter that supplies energy to be propagated to an array of transducers 11, 12, 13, and 14 disposed about the circumference of a circle with its center at a point 15. The propagated energy that is received by the transducer 11 after reflection from a target produces an electrical potential that is rectified and coupled to modulator 16. Similarly, the voltage produced in the transducer 12 by the reflected energy it receives is rectified and coupled to a modulator 17, and those of the transducers 13 and 14 are rectified and coupled respectively to modulators 18 and 20. It is to be understood that separate transducers may be used for transmisison and reception. The modulator 16 is also supplied with energy at a fixed frequency such as 400 cycles per second from a first output 21 of a generator 22 of any convenient type. The modulator 17 is supplied with energy from the generator 22 from an output 23 that produces a voltage shifted in phase from that of the output 21 by 90 degrees and designated as $$\phi_{\frac{\pi}{2}}$$

The modulator 18 is supplied with energy from generator 22 from an output 24 that produces a voltage shifted in phase by an additional 90 degrees and designated as $\phi_\pi$. The modulator 20 is supplied with energy from generator 22 from an output 25 that produces a voltage shifted in phase by an additional 90 degrees and designated by $$\phi_{\frac{3\pi}{2}}$$

The outputs of the modulators 16, 17, 18, and 20 are combined and then rectified in the rectifier 26 and applied to an indicator 27 which may most conveniently provide a PPI display on a cathode ray tube face. The indicator 27 may also receive synchronizing pulses from the transmitter 10 whenever an electrical pulse is supplied to the transducers to produce outgoing energy, so that the radial displacement of the spot on the screen of the indicator will represent the range of the target in a well-known manner.

Figure 2:
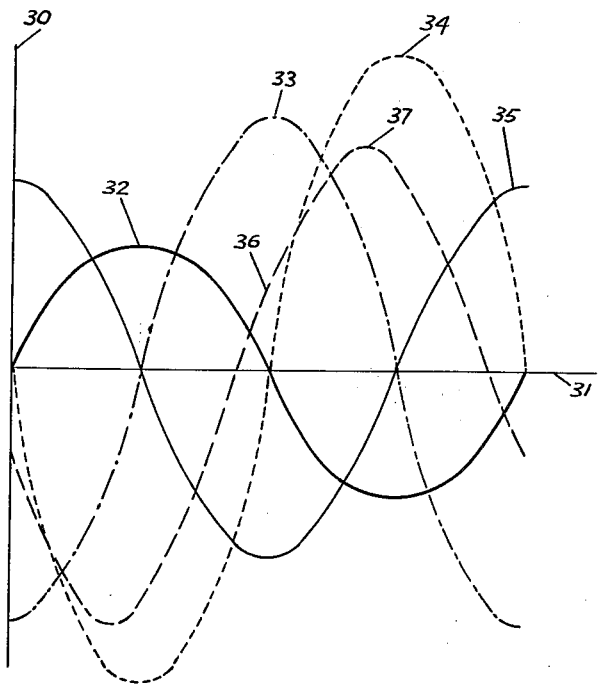
FIG. 2 is a graph illustrating the operation of the system of FIG. 1.

How the system of FIG. 1 can be used to indicate the angular displacement of the target from a reference direction can best be understood by reference to FIG. 2. The graphs of this figure represent the outputs of the generator 22 after the unidirectional modulation as four phase-separated sine waves with voltage plotted vertically along the axis 30, and time plotted horizontally along the axis 31. The sine wave 32 represents the reference phase $\phi_0$, the sine wave 33, the second phase $$\phi_{\frac{\pi}{2}}$$

the sine wave 34, the third phase $\phi_\pi$, and the sine wave 35, the fourth phase, $$\phi_{\frac{3\pi}{2}}$$

As is evident from FIGS. 1 and 2, the phase separation between successive ones of these sine wave voltages may be expressed as $T/n$, where $T$ is the period of the outputs of generator 22 and $n$ is the number greater than unity of the sine wave voltages employed. It will be noted that the graph 32 has the smallest peak amplitude and the graph 34 the greatest peak amplitude, with the graph 33 having the next greatest peak amplitude and the graph 35 having a peak amplitude between that of the graph 32 and that of the graph 33. These peak amplitudes represent the relative amplitudes of the signal received by the corresponding transducers 11 through 14. The graph 36 represents the sum of the curves 32, 33, 34, and 35. Due to the rectifier 26, only the positive portion shown above the line 31 appears at the input to the indicator. It will be noted that the peak 37 of this summation curve is located to the left of the peak of the curve 34 and to the right of the peak of the curve 33.

This is due to the relative amplitudes and phases of the different sine waves. The displacement of the peak 37 of the curve 36 from the peak of the reference phase, sine wave 32, is proportional to the angular displacement α of the target bearing (represented by the arrow 38) from the reference bearing, usually the ship's heading, represented by the dot-dash line 40 in FIG. 1. Thus it can be seen that the bearing of a target can be determined with relatively few transducers by the use of this invention. It is to be understood that, while sine waves are shown, cosine waves can also be used to give the same result, except that all the component wave forms will be shifted by 90 degrees.

What has been shown so far is a relatively simple embodiment of the invention to illustrate the operating principles involved. It has been found that the occurrence of signals from two or more targets at the same range at the same time will generally cause interference, and such signals will usually appear as one signal at a bearing somewhere between the bearings of the two signals. In order to minimize the chances of interference, the array can be divided into small groups of beams for interpolation, and the groups can be switched successively into the indicator. As is evident, the greater the number of beams employed, the greater is the resolution of the output indication.

Figure 3:
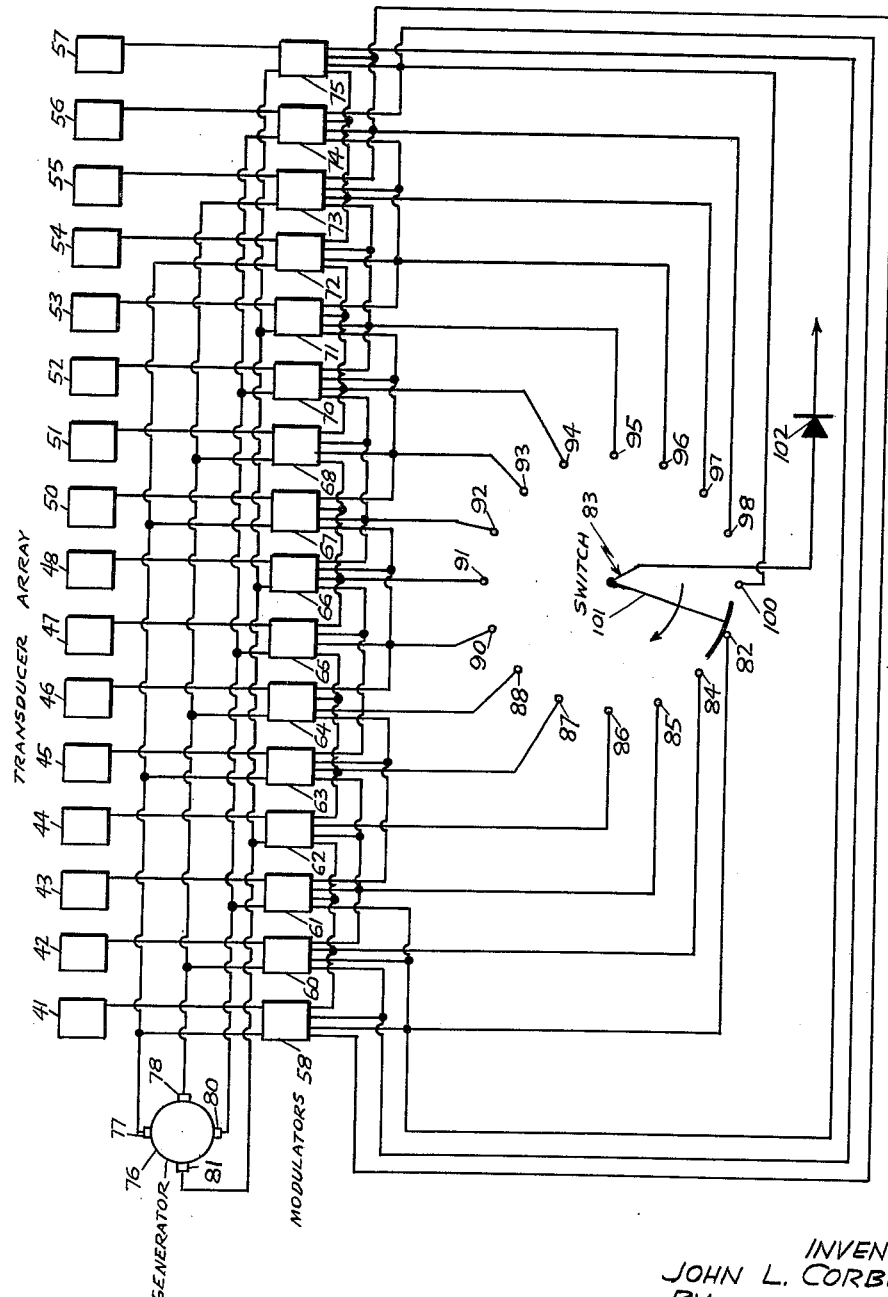
FIG. 3 is a schematic of an embodiment of the invention utilizing sixteen transducers and four phases.

FIG. 3 shows a block diagram of such a system with sixteen beams and four phase-separated generator output waves. It will be noted that, in this example, the number of beams modulating a phase is equal to the number of phases, namely four. It is not necessary that this be the case; however, this relationship permits simpler circuitry. In any case, in the system of the invention, the ratio of the number of interpolating phases to the number of beams in the array must equal the ratio of the switching frequency to the frequency of the phase generator.

In FIG. 3, signals from sixteen transducers 41 through 48 and 50 through 57 are applied to sixteen modulators 58, 60 through 68, and 70 through 75 to modulate the outputs of four different phases of the generator 76. The output in the reference phase $\phi_0$ from the first output 77 of the generator 76 is applied to modulators 58, 63, 67, and 72, where it is modulated by the outputs of transducers 41, 45, 50, and 54, respectively. Similarly, the output from generator 76 in the second phase $$\phi_{\frac{\pi}{2}}$$

from the second output 78 is applied to modulators 60, 64, 68, and 73, respectively, where it is modulated by the outputs of transducers 42, 46, 51, and 55, respectively. Similarly, the output from the generator 76 in the third phase $\phi_\pi$ from the third output 80 is applied to modulators 61, 65, 70, and 74, respectively, where it is modulated by the outputs of transducers 43, 47, 52, and 56, respectively. Similarly, the output from generator 76 in the fourth phase $$\phi_{\frac{3\pi}{2}}$$

from the fourth output 81 is applied to modulators 62, 66, 71, and 75, respectively, where it is modulated by the outputs from transducers 44, 48, 53, and 57, respectively. Each of these modulators has four independent outputs, and FIG. 3 shows the manner in which certain of such outputs are connected together and to respective stationary contacts of a commutating switch 83. As may be seen, switch contact 82 is connected to one of the outputs of each of the modulators 58, 60, 61 and 75, such outputs thereby being connected together for presentation of their sum to rectifier 102 and subsequent circuitry through the movable arm 101 of switch 83. Switch contact 84 receives the summation of another set of outputs from modulators 58, 60, and 61 together with one of the outputs from modulator 62. Switch contact 85 receives a signal comprising the sum of one of the remaining outputs of each of modulators 60, 61 and 62 with an output from modulator 63. The remaining output of modulator 61 is summed with one of the remaining outputs of modulators 62 and 63 and with an output of modulator 64. The remaining modulator outputs and switch contacts are similarly connected, with each of the stationary switch contacts being connnected to one of the outputs of each of four adjacent or consecutive modulators. In each such connection, the four respective modulator outputs are summed and presented to the switch 83.

The outputs of successive groups of four adjacent modulators (with three modulators being common to any two successive groups) are sequentially switched into the input of a suitable indicator through rectifier 102. The array of transducers and their associated modulators connected to the indicator at any one position of the switch 83 can be considered as obtaining much the same interpolation of the arc covered by those transducers as is obtained for the complete circle by the arrangement of FIG. 1. A complete revolution of the switch arm 101 covers the entire circle of transducers and gives greater discrimination between targets separated by a small difference in bearing than the arrangement shown in FIG. 1. In such a system, switching must be arranged so that at the instant beam 1 goes off, beam 5 comes on, and as beam 2 goes off, beam 6 comes on. More generally, each beam is switched on for the duration of one cycle of the interpolating wave from the generator.

If the output of each beam (which may conveniently be amplified) modulates one phase of a polyphase voltage of $N_\phi$ phases of equal amplitude E equally spaced through 360 degrees, with successive beams modulating phases in succession around the circle, the resulting output from each beam can be shown by the following formula:

$$e_0 = Ke\left[1 + \cos\frac{X}{N_\phi}\left\{\alpha - 2\pi\frac{(n-1)}{X}\right\}\right] \cdot \left[\cos\frac{2\pi(n-1)}{X} + j\sin 2\pi\frac{(n-1)}{X}\right] \quad (1)$$

where $e$ equals $E \cos \omega \cdot t$, $\omega$ being the interpolating frequency.

Figure 4:
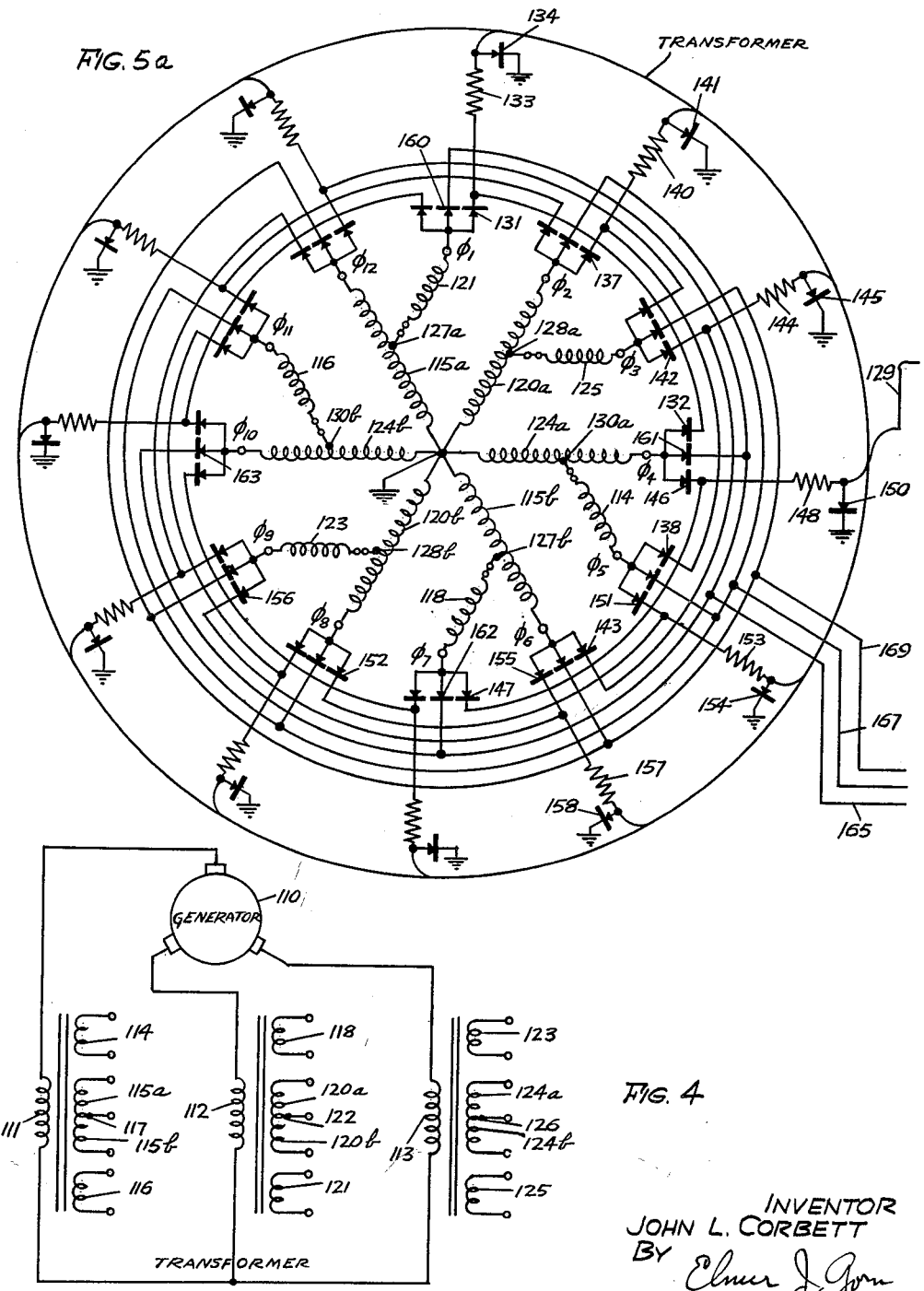
FIG. 4 is a schematic of a transformer system connected to produce twelve phases from the original three phases.

An electronic means for accomplishing this interpolation in a twelve-beam array is illustrated in FIGS. 4, 5a and 5b. A twelve-phase voltage at any convenient frequency such as 400 cycles per second is obtained from the transformer system shown in FIG. 4, where a generator 110 supplies each of three primary windings 111, 112, and 113 with a respective one of the original three phases. Each primary winding has associated with it three secondary windings; primary winding 111 has secondary windings 114, 115a and b, and 116, with the winding 115 having a center tap 117; primary winding 112 has secondary windings 118, 120a and b, and 121, with a center tap 122 on winding 120; and primary winding 113 has secondary windings 123, 124a and b, and 125, with a center tap 126 on the winding 124.

The secondary windings are connected as shown in FIG. 5a to produce twelve phases of equal amplitude. The center taps of windings 115, 120 and 124 are connected together and to a reference potential such as ground. Taps 127a and b, 128a and b, 130a and b, are made on each half of the windings 115, 120, and 124, respectively, so that the number of turns between each of such taps and the associated center tap bears the proportion $$\frac{\sqrt{3}}{3}$$

to the total number of turns in that half of the winding. One end of each of the secondary windings 114, 116, 118, 121, 123, and 125 is connected to a respective tap 130a, 130b, 127b, 127a, 128a. Their other ends produce phases $\phi_5$, $\phi_{11}$, $\phi_7$, $\phi_1$, $\phi_9$, and $\phi_3$, respectively, while the outer ends of windings 115a 120a, 124a, 115b, 120b, and 124b produce phases $\phi_{12}$, $\phi_2$, $\phi_4$, $\phi_6$, $\phi_8$, and $\phi_{10}$, respectively. Windings 121 and 124a are connected through rectifiers 131 and 132 to a resistor 133 the other end of which is connected to ground through a rectifier 134 and to one terminal of a winding 135 of a transformer 136 over one conductor of a 12-conductor cable 129. Windings 120a and 114 are connected through rectifiers 137 and 138 to a resistor 140, the other side of which is connected to ground through a rectifier 141. Windings 125 and 115b are connected through rectifiers 142 and 143 to a resistor 144, the other end of which is connected to ground through a rectifier 145. Windings 124a and 118 are connected through rectifiers 146 and 147 to a resistor 148, with a rectifier 150 connecting the other end of the resistor to ground. Windings 114 and 120b are similarly connected through rectifiers 151 and 152 to a resistor 153 and a rectifier 154. Windings 115b and 123 are connected through rectifiers 155 and 156 to resistor 157 and rectifier 158 in a similar manner. Similar connections are made for the other windings so that the rectified output of one phase is mixed with the rectified output of a phase three phases removed to form flat-topped gating pulses of proper width and position. In addition, windings 121, 124a, 118 and 124b are connected through rectifiers 160, 161, 162, and 163 respectively, to a phase filter 164 over line 165, thus connecting the rectified outputs of the windings carrying phases $\phi_1$, $\phi_4$, $\phi_7$, and $\phi_{10}$, to the phase filter 164. Similarly, the windings 120a, 114, 120b and 116 having phases $\phi_2$, $\phi_5$, $\phi_8$, and $\phi_{11}$ are connected to the input of a phase filter 166 over line 167, and the windings 125, 115b, 123 and 115a having phases $\phi_3$, $\phi_6$, $\phi_9$, and $\phi_{12}$, are connected to the input of a third phase filter 168 over line 169. Thus a polyphase interpolating voltage, synchronized with the scanning or switching frequency but at four times that frequency is generated. Each of the outputs developed across the shunt rectifiers 134, 141, 145, 150, 154, 158, etc. is applied over a separate conductor of the cable 129 to the grid 170 of a respective gating tube 171 through a winding 135 of a transformer such as transformer 136. A second winding 172 of the transformer 136 in each channel is coupled to the amplified output of a respective transducer 173. This output represents the high frequency energy propagated by the transmitter and received by the transducer after reflection from the target. The frequency of this energy is fifteen kilocycles in a representative equipment of this type, and the output of this gate is thus a pulse of fifteen kilocycle energy. The outputs of the several gates 171 are collected into three groups for connection to respective ones of three modulators 174, 175 and 176. The first, fourth, seventh and tenth gate outputs, taking the uppermost gate in FIG. 5b for the first, are connected together and to the input of modulator 174 to apply the gated signals thereto in sequence. The second, fifth, eighth and eleventh outputs are connected together and to the input of modulator 175 to apply the gated signals thereto in sequence, and the remaining gate outputs are similarly connected together and to modulator 176 to apply the gated signals thereto in sequence. Each modulator is also supplied with 1600 cycle per second energy from a respective one of the three phase filters 164, 166, and 168, which filters serve to extract the desired frequency from the harmonic-rich outputs of the associated rectifiers in FIG. 5a. The outputs of modulators 174, 175, and 176 are rectified by respective rectifiers 177, 178 and 180 and filtered in respective filters comprising resistors 181, 182, and 183 and capacitors 184, 185, and 186. The outputs are combined across a resistor 187, and the resultant summation signal is applied to an indicator 188 to give an output indication having a phase proportional to the relative bearing of the target. In the embodiment of FIGS. 5a and 5b modulation is effected after the switching operation, whereas the reverse procedure is employed in connection with the embodiments of the earlier figures. As is evident, the two procedures provide equivalent results. As is also apparent, in the general embodiments of FIGS. 1 and 3 the transducers indicated must incorporate suitable rectifying means for rectifying the transducer output prior to the application thereof to the respective modulator in order to produce the unidirectional modulation indicated in FIG. 2 (this being standard practice in the sonar art); in the more detailed showing of FIG. 5b the necessary rectification of the transducer output may be effected in the gates 171 or in the rectifiers 177, 178, and 180. As will be understood by those skilled in the art, it is necessary to rectify the high frequency transducer signal at some suitable point prior to the addition of the three sine waves in order to form the output signal; additional rectification (either by a diode 26 or in the indicator itself) will often prove desirable in order to remove the modulating frequency from the output signal.

Much of the complexity of the system shown in FIGS. 1 through 5b can be eliminated by the use of the capacitive commutator illustrated in FIGS. 6 and 8. The operation of this commutator can best be understood by reference to the cylindrical embodiment shown in FIG. 6. Plates 200 through 204 have the shape of a half a sine wave and are arranged about a cylindrical surface. As shown in FIG. 6, the cylindrical surface has been unrolled into a flat plane to better illustrate the principle of operation. The maximum width of each plate along the circumference is made equal to 180 dgerees at the interpolating frequency (i.e., the frequency established by curve 207, for example, in FIG. 7), as indicated by the dimension $\pi$ in FIG. 6. The flat edges of successive plates associated with odd numbered beams are in substantial alignment at one edge of the structure shown, and the flat edges of successive plates associated with even numbered beams are in substantial alignment at the opposite edge thereof. Each plate is connected to the transducer or array of transducers associated with one of the beams. A rectangular plate 205 is formed into a cylindrical surface and is mounted for rotation so as to successively lie in registry with one or more of the sinusoidal plates 200 through 204. The width of this rectangular plate along the circumference of the cylindrical structure is equal to the maximum width of the stator plates also measured along the circumference, and, as shown, the length is substantially equal to the spacing between the straight edges of adjacent stator plates.

It can be shown that the capacity appearing between the rotor plate 205 and the plates 200 through 203 varies as shown by the curves 207, 208, 210, and 211, respectively, in FIG. 7. These curves show the capacity plotted vertically along the axis 212, and time plotted horizontally along the axis 213. As is evident from FIGS. 6 and 7, the spacing between the stationary plates in the direction of rotor motion is $360/n$ electrical degrees where $n$ is the number of individual stationary plates with which the rotary plate 205 lies in at least partial registry at any given moment. When a voltage is applied to any stator plate, a varying voltage is produced across the resistor 206 that is proportional to the varying capacity between the moving rotor and that stator plate. It will be seen that the curves 207, 208, 210, and 211 have a shape similar to that of curves 32, 33, and 34 in FIG. 2, except that their maximum amplitudes are shown equal. With unequal signals coming in from the transducers, the commutator of FIG. 6 can be seen to give a result similar to the more elaborate circuits of FIGS. 1 through 5b. This single commutator circuit produces the polyphase voltages, the modulation and the switching that are produced by the relatively complicated circuits shown in FIGS. 1 through 5b, which require a separate apparatus for each function.

The commutator can be made to occupy less space if the stator plates are disposed in substantially planar (as opposed to cylindrical) ring-like form, with their profiles distorted to compensate for the polar coordinate layout.

It will be seen that the straight edges become concave curves on the plates 215, 217, 219, 221, 223, and 225, representing odd numbered beams, and convex curves on the plates 216, 218, 220, 222, 224, and 226, representing even numbered beams. It will be further noted that the plates for odd numbered beams are elongated in the radial dimension, while the plates for even numbered beams are shortened in this dimension, in comparison to the shapes shown in FIG. 6. The rotor plate 227 is formed with two converging straight edges in the radial dimension, and two parallel curved edges concentric with the circular form of the layout of the stator plates. This rotor plate 227 is mounted on an arm 228 that is connected by means of a slip ring 229 and brush 230 to a load resistor 231 across which the output voltage is developed to give an output similar to that of the cylindrical commutator of FIG. 6.

The voltage produced as the rotor plate passes over each stator plate equals $E(1-\cos x)$. The stator plates are taken as having a shape represented by some function, $f(x)$, and it is desired that the change in capacity as the rotor passes over the stator plates shall be $$\frac{dx}{dt} \text{ equals } 1 - \cos x$$

The integral of the function $f(x)$ representing the stator shape gives the incremental change in the area and thus in capacity, that is, $$\int f(x)dx = F(x) + c \qquad (2)$$

$F(x)+c$ can be made to be the desired shape $1-\cos x$, then $$\int f(x)dx = 1 - \cos x \qquad (3)$$

and differentiating with respect to $x$ gives a stator plate shape of $f(x)$ equals sine $x$. The overlapping wave forms 207, 208, 210, and 211 shown in FIG. 7 are produced by the arrangement of the conductive plates 200, 201, 202, 203, and 204 shown in FIG. 6, or the arrangement of the plates 215 through 219 shown in FIG. 8.

Other methods of producing a plurality of phases of a voltage at a given frequency and modulating each phase of this polyphase voltage with the output of one or a group of transducers while switching the outputs of the various modulators in succession into an indicator will occur to a person skilled in this art.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A direction-finding system comprising a plurality of transducer means, signal-level indicating means, and a rotary capacitive commutator having a plurality of relatively stationary plates mounted along a path and an additional plate positioned adjacent said path, said additional plate and said plurality of plates being mounted for relative motion between the former and the latter to effect a scanning motion of said additional plate along said path successive ones of said plurality of plates in capacitive relationship therewith, each of said stationary plates being connected to a selected one or more of said transducer means, said additional plate being connected to an input of said indicating means, the relative shapes of said additional plate and each of said plurality of plates being defined by the relationship $C \propto (1-\cos \theta)$ where $0 \leq \theta \leq 360$ degrees, and C is the capacity between said additional plate and each of said plurality of plates at a relative position of $\theta$ electrical degrees where $\theta$ varies from zero through 180 to 360 degrees as said additional plate moves relative to each of said plurality of plates from a position of zero overlap through a position of maximum overlap to a second position of zero overlap, the spacing between corresponding elements of said plurality of plates measured along said path being defined by the relationship $$\phi = \frac{360}{n}$$

where "$n$" is three or greater and is the number of individual ones of said plurality of plates with which said additional plate lies in at least partial registry at any given moment and $\phi$ is the said spacing expressed in such electrical degrees, whereby the signal amplitude of the said movable plate varies in response to unequal outputs from said transducer means.

2. A scanning system comprising a plurality of signal detectors, signal-level indicating means, and a rotary capacitive commutator having a plurality of relatively stationary plates mounted along a path and an additional plate positioned adjacent said path, said additional plate and said plurality of plates being mounted for relative motion between the former and the latter to effect a scanning motion of said additional plate along said path past successive ones of said plurality of plates in capacitive relationship therewith, each of said stationary plates being connected to a selected one or more of said signal detectors, said additional plate being connected to an input of said indicating means, the relative shapes of said additional plate and each of said plurality of plates being defined by the relationship $C \propto (1-\cos \theta)$ where $0 \leq \theta \leq 360$ degrees, and C is the capacity between said additional plate and each of said plurality of plates at a relative position of $\theta$ electrical degrees where $\theta$ varies from zero through 180 to 360 degrees as said additional plate moves relative to each of said plurality of plates from a position of zero overlap through a position of maximum overlap to a second position of zero overlap, the spacing between corresponding elements of said plurality of plates measured along said path being defined by the relationship $$\phi = \frac{360}{n}$$

where "$n$" is three or greater and is the number of individual ones of said plurality of plates with which said additional plate lies in at least partial registry at any given moment and $\phi$ is the said spacing expressed in such electrical degrees, whereby the signal amplitude of the said movable plate varies in response to unequal outputs from said signal detectors.

3. A direction-finding system comprising a plurality of transducer means, means connected to said plurality of transducer means and having a plurality of output elements for providing a corresponding plurality of phase-separated sine wave voltages of a single selected frequency in response to signals from said plurality of transducer means, the phase separation between successive ones of said sine wave voltages being $T/n$ where "$n$" is three or greater and and is the number of said sine wave voltages generated at a given instant and T is the period of said selected frequency, the peak amplitudes of each of said voltages being proportional to the amplitude of the output of a respective one or more of said transducer means, and a signal-level indicating means having an input connection, the outputs of said voltage-providing means being connected together and to the input of said indicating means, whereby said plurality of sine wave voltages are combined to provide a single output voltage the phase and amplitude of which are determined by the relative amplitudes of the output signals from said transducer means.

4. A scanning system comprising a plurality of signal detectors, means connected to said plurality of signal detectors and having a plurality of output elements for providing a corresponding plurality of phase-separated sine wave voltages of a single selected frequency in response to signals from said plurality of signal detectors, the phase separation between successive ones of said sine wave voltages being $T/n$ where "$n$" is three or greater and is the number of said sine wave voltages generated at a given instant and T is the period of said selected frequency, the peak amplitudes of each of said voltages being proportional to the amplitude of the output of a respective one or more of said input sources, and a signal-level indicating means having an input connection, the outputs of said voltage-providing means being connected together and to the input of said indicating means, whereby said plurality of sine wave voltages are combined to provide a single output voltage the phase and amplitude of which are determined by the relative amplitudes of the output signals from said signal detectors.

5. A direction-finding system comprising a plurality of transducer means, means for generating a plurality of phase-separated sine wave voltages of equal amplitude at a single selected frequency each appearing at a separate output of said generating means, means interconnecting each of said transducer means and a respective one of said outputs of said generating means for amplitude-modulating each of said sine wave voltages in accordance with the output of a respective one or more of said transducer means, the phase separation between successive ones of such modulated sine wave voltages being $T/n$ where "$n$" is three or greater and is the number of such modulated voltages at a given instant and T is the period of said selected frequency, and a signal-level indicating means having an input connection, with the outputs of said modulating means being connected together and to the input of said indicating means, whereby said plurality of sine wave voltages are modulated and combined to provide a single output voltage the phase and amplitude of which are determined by the relative amplitudes of the output signals from said transducer means.

6. A scanning system comprising a plurality of signal detectors, means for generating a plurality of phase-separated sine wave voltages of equal amplitude at a single selected frequency each appearing at a separate output of said generating means, means interconnecting each of said signal detectors and a respective one of said outputs of said generating means for amplitude-modulating each of said sine wave voltages in accordance with the output of a respective one or more of said signal detectors, the phase separation between successive ones of such modulated sine wave voltages being $T/n$ where "$n$" is three or greater and is the number of such modulated voltages at a given instant and T is the period of said selected frequency, and a signal-level indicating means having an input connection, with the outputs of said modulating means being connected together and to the input of said indicating means, whereby said plurality of sine wave voltages are modulated and combined to provide a single output voltage the phase and amplitude of which are determined by the relative amplitudes of the output signals from said signal detectors.

7. An echo ranging system comprising means for periodically propagating energy at substantially a single frequency, a plurality of transducer means for receiving said energy after reflection, means for generating a plurality of cyclically varying voltages of different phases but of the same amplitude, an indicator, means to modulate in amplitude each of said cyclically varying voltages with the output of at least one of the transducers, to combine the output of said modulating means, and to apply said combined output to said indicator, said last mentioned means comprising a capacitive commutator formed by a plurality of fixed plates and a moving plate shaped as a part of a sector to form simultaneously a capacitor between the moving plate and at least three of the fixed plates, said capacitances varying as the sine of the angular displacement of the moving plate, the sum capacitance between said moving plate and said fixed plates remaining constant.

8. A scanning system comprising a plurality of signal detectors for detecting electrical energy at substantially a single frequency, means for generating a plurality of cyclically varying voltages of different phases but of the same amplitude, an indicator, means to modulate in amplitude each of said cyclically varying voltages with the output of at least one of said sources, to combine the output of said modulating means, and to apply said combined output to said indicator, said last mentioned means comprising a capacitive commutator formed by a plurality of fixed plates and a moving plate shaped to form simultaneously a capacitor between the moving plate and at least three of the fixed plates, said capacitances varying as the sine of the angular displacement of the moving plate, the sum capacitance between said moving plate and said fixed plates remaining constant.

References Cited in the file of this patent

UNITED STATES PATENTS

| | | |
|---|---|---|
| 1,863,716 | Hecht et al. | June 21, 1932 |
| 2,337,272 | Roberts | Dec. 21, 1943 |
| 2,418,156 | Bollman | Apr. 1, 1947 |
| 2,452,675 | Newitt | Nov. 2, 1948 |
| 2,476,977 | Hansel | July 26, 1949 |
| 2,678,435 | Vaughan | May 11, 1954 |
| 2,701,357 | Newby | Feb. 1, 1955 |
| 2,760,127 | Duncan | Aug. 21, 1956 |
| 2,769,159 | Moore | Oct. 30, 1956 |
| 2,786,193 | Rich | Mar. 19, 1957 |
| 2,818,550 | Crandell et al. | Dec. 31, 1957 |
| 2,902,673 | Hare | Sept. 1, 1959 |

FOREIGN PATENTS

| | | |
|---|---|---|
| 569,303 | Great Britain | May 17, 1945 |